(No Model.)

O. V. BLAZIER.
SNAP HOOK.

No. 399,005.  Patented Mar. 5, 1889.

Witnesses.
Chas H. Smith
J. Staib

Inventor.
Oscar V. Blazier
per Lemuel W. Serrell

UNITED STATES PATENT OFFICE.

OSCAR V. BLAZIER, OF GILLETTE, NEW JERSEY.

SNAP-HOOK.

SPECIFICATION forming part of Letters Patent No. 399,005, dated March 5, 1889.

Application filed December 17, 1888. Serial No. 293,819. (No model.)

*To all whom it may concern:*

Be it known that I, OSCAR V. BLAZIER, of Gillette, in the county of Morris and State of New Jersey, have invented an Improvement in Hooks for Traces, Chains, and Similar Articles, of which the following is a specification.

Snap-hooks have heretofore been made with a spring to close the mouth of the rigid hook; but this spring is liable to injury from rust, and more especially from the chain coming into contact with the end of the spring when such snap-hook is used with the trace-chain in heavy harness.

My improved hook is made for the purpose of dispensing entirely with a spring and for closing the hook in such a manner that it cannot be opened while there is any pull or tension upon the chain, strap, or other article with which it is connected, and this hook can be easily opened for disconnecting the ring or attachment when the tension upon the trace or chain is relieved.

Figure 1:
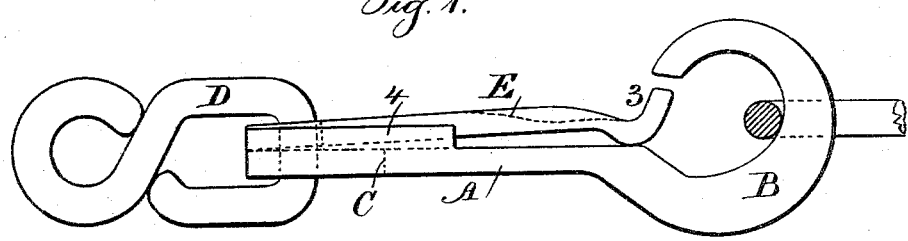
Figure 2:
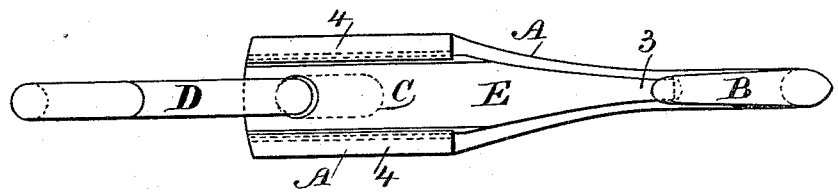
Figure 3:
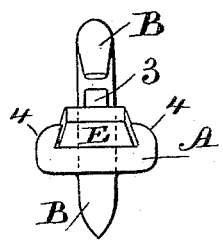

In the drawings, Figure 1 is a side elevation of the improved hook. Fig. 2 is a plan, and Fig. 3 an end, view of the same.

The body A of the hook and the hook B are of any desired size, shape, or strength, and in the body A, near the opposite end from the hook B, is a longitudinal slot or mortise, C, through which passes an S-shaped hook, D, or other device by which the hook A B is connected with the trace, chain, or other article upon which it is employed. Upon the body A is a sliding hook-closer, E, having a head, 3, that is adapted to fill the mouth of the hook, or nearly so, and the body portion of the hook-closer slides between the flanges 4 upon the body A of the hook, and these flanges 4 are dovetailed or undercut, and there is a hole through the hook-closer coinciding with the slot or mortise C in the body A of the hook, so that the connection D can pass through this hole, and the position of this hole is such that when tension is applied to the trace or chain and the connection D drawn to the end of the slot C distant from the hook B the head 3 of the hook-closer will occupy the mouth of the hook B and effectually close the same; but when the tension upon the trace or chain is slackened the hook-closer E can be slipped along upon the body A until the connection D strikes the end of the slot C nearest the head B, and in this position the head 3 of the hook-closer will be within the hook B and sufficiently distant from its end to allow the ring, loop, or similar device to be passed into or out of such hook B.

I remark that the hook-closer E, near the head 3, may be made sufficiently thin, as indicated by dotted lines, Fig. 1, to spring slightly and produce a frictional contact between the head 3 of the hook-closer and the body A or the point of the hook, and the dovetailed or undercut flanges 4 may be upon the body of the hook-closer E and receive the edges of the body A, although I prefer the form represented in the drawings.

I claim as my invention—

1. The combination, with the hook B and body A, having a longitudinal slot, C, of the sliding hook-closer E, having a head, 3, to close the mouth of the hook, and a hole through which the connection D to the trace or chain passes, substantially as set forth.

2. The combination, with the hook B and slotted body A, of the sliding hook-closer E, having a head, 3, and a connection to the chain or trace, whereby the tension upon the chain or trace draws the head 3 into the mouth of the hook, substantially as set forth.

Signed by me this 12th day of December, 1888.

OSCAR V. BLAZIER.

Witnesses:
WILLIAM M. STILLMAN,
WILLIAM A. CODDINGTON.